United States Patent Office 3,379,684
Patented Apr. 23, 1968

3,379,684
METHOD OF PREPARING HIGH-MOLECULAR POLYHYDROXYETHERS
Ivo Wiesner, 8 Kosmonautu, Usti nad Labem, Czechoslovakia, and Vladimír Horák, 106 Jablonecka, Lucany nad Nisou, Czechoslovakia
No Drawing. Filed Apr. 20, 1965, Ser. No. 449,607
Claims priority, application Czechoslovakia, Apr. 29, 1964, 2,512/64
9 Claims. (Cl. 260—47)

ABSTRACT OF THE DISCLOSURE

The poly-addition product obtained by polymerization in the solid phase of (a) at least one diepoxide compound wherein the oxygen atom of the epoxy group is attached to two carbon atoms and, with said carbon atoms, forms a 3-membered ring and (b) an aromatic compound having two phenolic groups, the said product having a molecular weight of at least about 45,000.

---

This invention relates to a method of preparing high-molecular weight polyhydroxyethers by reacting diepoxide compounds with bisphenols or diphenolic compounds and the product obtained thereby.

Lately high-molecular weight polyhydroxyethers have met with great success and publicity, mostly on acount of their outstanding mechanical and electrical properties. These macromolecular substances are used as intermediate products for preparing coating materials of excellent quality and, besides, as compression or potting materials and adhesives. Several types of high-molecular polyhydroxyethers are resistant to the action of direct flame, in which regard they surpass any of the non-flammable and self-extinguishing plastics heretofore known. By their thermal resistance and mechanical stability within the range of $-70°$ C. to $+160°$ C. they are equal to the polycarboxylates, surpassing them, however by their lower production cost and outstanding adhesion.

High-molecular weight polyhydroxyethers can be modified in various ways in order to adapt certain of their properties, especially to improve their resistance to solvents. Provided the high-molecular weight polyhydroxyethers attain a certain molecular weight (about 50,000), first-quality fibers can be made thereof. According to the prior art, high molecular weight polyhydroxy ethers can be prepared only by direct reaction of bisphenols with epichlorohydrin in an alkaline medium. Attempts to prepare high-molecular weight polyhydroxyethers by direct polyaddition of diepoxide compounds and bisphenols have so far not met with success, the highest molecular weight thus attained being only 8000. The molecular weight of polyhydroxyethers prepared by direct reaction of bisphenols with epichlorohydrin on the other hand, reached values up to a 45,000 maximum.

It is therefore an object of this invention to provide for an improved process of making polyhydroxyethers. It is in particular an object of the invention to provide for a process of making the polyhydroxyethers from relatively inexpensive starting products and at commercially feasible conditions.

Under a more general aspect, the invention involves the object to form a polyhydroxyether of very high molecular weight. More specifically, it is an object of the invention to form polyhydroxyether by reaction between bisphenols and epoxide compounds wherein a polymer is obtained of molecular weights of above 40,000 and more specifically between about 45,000 and 100,000.

In a still more specific way the invention has the object of providing for a process of preparation of polyhydroxyether polymers which gives a high yield and results in minimum degradation of the product and does not require the separate step of removal of solvents or recovery of the desired product from a solution.

This and other objects of the invention will become apparent from the following description.

It has now been found that high-molecular polyhydroxyethers can be prepared by direct reaction between bisphenols and diepoxide compounds or diphenolic compounds, provided the reaction of these components is carried out in bulk at a temperature below the softening point of the reaction product at any given moment, and in the presence of a catalyst comprising tertiary amines having a dissociation constant of $10^{-3}$ to $10^{-8}$ and a boiling point above $100°$ C. The molar ratio epoxide group/hydroxyl group in the reaction should equal 1.0–1.2. The preferred reaction temperature may vary e.g. within the range of $80-160°$ C.

The reaction mixture is prepared by pouring the individual components into a mold wherein the reaction proper takes place. After the polyaddition is complete, the high-molecular weight polyhdroxyether is removed from the mold, cut to shreds or ground to pieces. If desired, it may also be dissolved in a suitable solvent.

As the diepoxide compounds there are used, for example: aliphatic, hydroaromatic, or aromatic glycidyl ethers, epoxide compounds resulting from epoxidation of dienes, diglycidyl esters of dicarboxylic acids, or mixtures of these diepoxide compounds.

The second reaction component are bisphenols, particularly bisphenol A, bisphenol S, bisphenol F, bisphenol H, bisphenol G, tetrachloro-bisphenol A, tetraboromobisphenol A, dichloro-bisphenol A, dibromo-bisphenol A, and other bisphenols of the general structure:

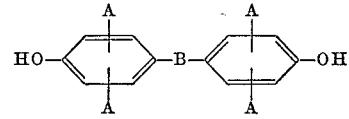

wherein A is: H, Cl, Br, $CH_3$, $C_2H_5$, and B is:

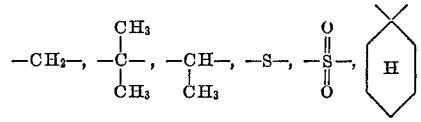

or mixtures of such compounds. Instead of bisphenols, or in admixture with them, diphenols can be used, such as resorcinol, hydroquinone, dihydroxydiphenyl, dihydroxyoctachlorodiphenyl, etc.

The molecular weight of the polyhydroxyethers is directly dependent on the molar ratio expoxide group/phenolic group which will vary between 1.00 and 1.20, and preferably is from 1.04 to 1.07, in accordance with the desired molecular weight of the final product.

As catalysts for the reaction there are used tertiary amines of the general formula:

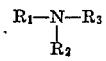

wherein $R_1$ is alkyl having two to twenty carbon atoms or aralkyl, and wherein $R_2$ and $R_3$ are alkyls with $C_1$–$C_5$ and may be identical or different, or are epoxy groups.

Preferably the catalyst is benzyldiethyl amine, cyclohexyl amine diepoxide, 2-(phenyl)ethyl-diethyl amine, 2-(phenyl)ethyl-dipropyl amine, and benzyldipropyl amine, or another tertiary amine having a dissociation constant of $10^{-3}$–$10^{-8}$. The amount of catalyst should vary within the range of 0.01–5%.

Example I 913 g. bisphenol A with a M.P. of 156.8° C. was dissolved upon stirring in 1,457 g. bis(glycidylether)bisphenol A, containing 0.5865 epoxy-equivalent per 100 g. of compound. To the solution, at 120° C., 12 g. benzyldiethyl amine was added and the mixture was cast into a mold and allowed to react for 25 hours at 120° C. After cooling the polyhydroxyether of bisphenol A in form of a compact block thus formed was taken from the mold. The softening point of the product was 255° C., and the point of transition of $II_{nd}$ order was 120° C.

Example II 1001 g. bisphenol S was dissolved upon stirring in 1416 g. bis(glycidylether)bisphenol A. To the solution thus prepared, at 130° C., 26 g. cyclohexylamine diepoxide was added and the mixture stirred until homogeneous. The homogeneous solution was then cast into a mold, and allowed to react for 15 hours at 125° C. After cooling the polyhydroxyether block was removed from the mold. The softening point of the product was 264° C. and the point of transition of $II_{nd}$ order 148° C.

Example III 913 g. bisphenol A was dissolved at 120° C. in 1443 g. bis(glycidylether)bisphenol A, and 18 g. benzyldipropyl amine were added. The mixture was cast into molds and allowed to react for 40 hours at 100° C. After cooling the polyhydroxyether block was taken from the mold. The product had a softening point of 275° C.

Example IV 1464 g. tetrachlorobisphenol A was mixed with 1619 g. crystalline bis(glycidylether)tetrachlorobisphenol A, and the mixture melted at 120° C. To the melt 6 g. dimethyloctadecyl amine were added and the total cast into a mold. The reaction was permitted to run for 8 hours at 115° C. After cooling the polyhydroxyether block was removed from the mold. The product had a softening point of 286° C. and a transition point of $II_{nd}$ orde rof 115° C. The polyhydroxyether was self-extinguishing and non-flammable.

Example V 1001 g. bisphenol S was mixed with 1510 g. bis(glycidylether)bisphenol S, and at 120° C. 30 g. 2-(phenyl)ethyl-dipropyl amine were added whereupon the homogeneous solution was cast into a mold and allowed to react for 22 hours at 130° C. After cooling the block of polyhydroxyether was taken from the mold. The product had a softening point of 280° C.

The above examples have been given to illustrate various aspects of the invention. Such illustration, however, is given without any intent of limiting the scope of protection. We, therefore, do not wish to be limited otherwise than by the language of the appended claims.

We claim:

1. A process of making a poly-addition product, comprising the steps of reacting in bulk and in the solid phase (a) a diepoxide compound wherein the oxygen atom of the epoxy group is attached to two carbon atoms and with said carbon atoms forms a 3-membered ring with (b) at least one aromatic compound having two phenolic groups and being free of substituents that would interfere with the reaction, the reaction being effected at a temperature lower than the softening point of the reaction product formed at any given moment and in the presence of a catalyst comprising a tertiary amine having a dissociation constant between $10^{-3}$ and $10^{-8}$, the molar ratio of epoxide group to hydroxyl group being between 1.0 and 1.20.

2. The process of claim 1, wherein the aromatic compound is a polynuclear dihydroxyphenol.

3. The process of claim 1, wherein the molar ratio of epoxide group to hydroxyl group is between 1.0 and 1.20.

4. The process of claim 1, wherein the temperature during the reaction is between 80 and 160° C.

5. The process of claim 1, wherein the catalyst is selected from the group consisting of benzyldiethyl amine, cyclohexyl amine diepoxide, 2-(phenyl)-ethyl-diethyl amine, 2-(phenyl)-ethyl-dipropyl amine, and benzyldipropyl amine.

6. The process of making a poly-addition product comprising reacting in a mold (a) a diepoxide compound wherein the oxygen atom of the epoxy group is attached to two carbon atoms and, with said carbon atoms, forms a 3-membered ring, with a polynuclear dihydroxyphenol compound of the general structure

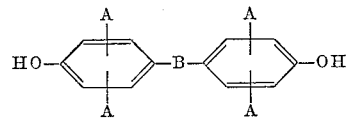

wherein A is H, Cl, Br, $CH_3$ or $C_2H_5$, and B is

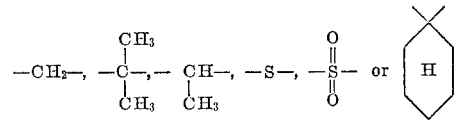

or mixtures of such compounds, and effecting the reaction at a temperature lower than the softening point of the reaction product formed at any given moment and not in excess of 160° C. and for a time sufficient to effect the bulk polymerization in the solid phase between the said components, the reaction being carried out in the presence of a catalyst comprising a tertiary amine having a dissociation constant between $10^{-3}$ and $10^{-8}$, followed by the step of cooling and removing the thus formed solid block from the mold.

7. The process of claim 1 wherein the diepoxide compound is selected from the group consisting of aliphatic, hydroaromatic or aromatic glycidyl ethers, epoxide compounds obtained by epoxidation of dienes, diglycidyl esters of dicarboxylic acids, or mixtures of these compounds and said aromatic compound is selected from the group consisting of bisphenol A, bisphenol S, bisphenol F, bisphenol H, bisphenol G, tetrachloro-bisphenol A, tetrabromobisphenol A, dichloro-bisphenol A, dibromo-bisphenol A.

8. The process of claim 1, wherein the diepoxide compound is selected from the group consisting of bis(glycidylether)bisphenol A, bis(glycidylether)tetrachloro-bisphenol A, bis(glycidylether)bisphenol S.

9. The process of claim 1, wherein the aromatic compound is selected from the group consisting of bisphenol A, bisphenol S and tetrachlorobisphenol A.

References Cited

UNITED STATES PATENTS 3,277,048   10/1966   Sonnabend _____ 260—47

WILLIAM H. SHORT, *Primary Examiner.*

T. D. KERWIN, *Assistant Examiner.*